United States Patent
Luo et al.

(10) Patent No.: US 8,821,975 B2
(45) Date of Patent: Sep. 2, 2014

(54) METHOD FOR MAKING BRANCHED CARBON NANOTUBES

(75) Inventors: Chun-Xiang Luo, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 657 days.

(21) Appl. No.: 11/978,071

(22) Filed: Oct. 26, 2007

(65) Prior Publication Data

US 2008/0299308 A1 Dec. 4, 2008

(30) Foreign Application Priority Data

Jun. 1, 2007 (CN) .......................... 2007 1 0074810

(51) Int. Cl.
| | | |
|---|---|---|
| C23C 16/00 | (2006.01) | |
| B82Y 40/00 | (2011.01) | |
| C01B 31/02 | (2006.01) | |
| B82Y 30/00 | (2011.01) | |

(52) U.S. Cl.
CPC ............. *C01B 31/0233* (2013.01); *B82Y 40/00* (2013.01); *C01B 2202/20* (2013.01); *B82Y 30/00* (2013.01); *Y10S 977/843* (2013.01)
USPC ...................................... 427/249.1; 977/843

(58) Field of Classification Search
None
See application file for complete search history.

(56) References Cited

U.S. PATENT DOCUMENTS

| | | |
|---|---|---|
| 6,325,909 B1 | 12/2001 | Li et al. |
| 6,837,928 B1 * | 1/2005 | Zhang et al. ..................... 117/95 |
| 2003/0118727 A1 * | 6/2003 | Ting et al. ................... 427/249.1 |
| 2006/0137741 A1 | 6/2006 | Park et al. |
| 2006/0228289 A1 * | 10/2006 | Harutyunyan et al. .... 423/447.3 |
| 2007/0224104 A1 | 9/2007 | Kim |
| 2009/0068461 A1 | 3/2009 | Reneker et al. |

FOREIGN PATENT DOCUMENTS

| | | |
|---|---|---|
| JP | 2002-329723 | 11/2002 |
| JP | 2003-238123 | 8/2003 |
| JP | 2004-59428 | 2/2004 |
| JP | 2007-515364 | 6/2007 |
| JP | 2007-175205 | 7/2007 |
| JP | 2007-528339 | 10/2007 |
| WO | WO2006057833 A3 | 6/2006 |

OTHER PUBLICATIONS

Pisana (Physica E 37 (2007) p. 1-5, published online Sep. 7, 2006).*

(Continued)

*Primary Examiner* — Michael Cleveland
*Assistant Examiner* — Joel Horning
(74) *Attorney, Agent, or Firm* — Novak Druce Connolly Bove + Quigg LLP

(57) ABSTRACT

A method for making a branched carbon nanotube structure includes steps, as follows: providing a substrate and forming a buffer layer on a surface of the substrate; depositing a catalyst layer on the surface of the buffer layer; putting the substrate into a reactive device; and forming the branched carbon nanotubes on the surface of the buffer layer and along the surface of the buffer layer by a chemical vapor deposition method. The material of the catalyst layer is non-wetting with the material of the buffer layer at a temperature that the branched carbon nanotube are formed. A yield of the branched carbon nanotubes in the structure can reach about 50%.

18 Claims, 2 Drawing Sheets

(56) References Cited

OTHER PUBLICATIONS

Kukovitsky (Chemical Physics Letters 317 (2000) 65-70.*
Eun Ju Bae et al."Single-walled carbon nanotube growth on glass" Nanotechnology vol. (18),No. 1,P015601,Dec. 8, 2006.

Yun-Hi Lee, et al., "Direct nano-wiring carbon nanotube using growth barrier: A possible mechanism of selective lateral growth" Journal of Applied Physics, May 1, 2002, vol. 91, No. 9, pp. 6044-6050.
Yunyu Wang et al., Comparison study of catalyst nanoparticle formation and carbon nanotube growth: Support effect, Journal of Applied Physics 101, 124310 (2007).

* cited by examiner

US 8,821,975 B2

METHOD FOR MAKING BRANCHED CARBON NANOTUBES

BACKGROUND

1. Field of the Invention

The invention relates generally to methods for making carbon nanotubes and, particularly, to a method for making the branched carbon nanotubes.

2. Discussion of Related Art

Carbon nanotubes (CNTs) were first discovered by S. Iijima (Nature, vol. 354, pp. 56-58, 1991) and were synthesized by T. W. Ebbesen and P. M. Ajayan (Nature, vol. 358, pp. 220-222, 1992). Theoretical studies show that carbon nanotubes exhibit either metallic or semiconductive behavior depending on the radii and helicity of the nanotubes. CNTs have interesting and potentially useful electrical and mechanical properties and offer potential for use in electronic devices such as field emission displays, micro electron sources in vacuum, and nano-scale devices. Particularly, the branched CNTs have the unique electrical and thermal properties due to a three-terminal/three-dimensional tubular structure. Therefore, the branched CNTs can be widely used in the nano-scale integrated circuits.

At present, the traditional methods for making the branched CNTs include an arc-discharge method, a template method, and a metal organic chemical vapor deposition (MOCVD) method. The arc-discharge method has low yield, the template method has a complex process, and the prevalent method is the MOCVD method. The MOCVD method is costly in manufacture due to use of a metal organic gas as a raw material and cannot form the branched CNTs in a predetermined area. Thus, the application of the MOCVD method in the nano-scale integrated circuits is limited.

What is desired is a low-cost, high-yield, and simple method for making the branched CNTs in a predetermined/chosen area/location.

SUMMARY OF THE INVENTION

A method for making the branched carbon nanotubes includes steps, as follows: providing a substrate and forming a buffer layer on a surface of the substrate; depositing a catalyst layer on the surface of the buffer layer, the material of the catalyst layer being not infiltrative (i.e., being non-wetting) with the material of the buffer layer; putting the substrate into a reactive device; and forming the branched carbon nanotubes on the surface of the buffer layer and along the surface of the buffer layer by a chemical vapor deposition method.

Compared with the traditional method for making the branched carbon nanotubes, the present method has the follow advantages: (1) low cost, due to the use of acetylene, ethylene, methane or any suitable chemical compound as a raw material source for carbon; (2) a high yield on the verge of 50%; and (3) good electrical conduction, due to the use of the noble metal as the catalyst, which is ultimately located on the distal end of the branched carbon nanotubes. Furthermore, each branched carbon nanotube can be formed on/at a certain location, by patterning the catalyst layer according to, e.g., a photo-etching method.

BRIEF DESCRIPTION OF THE DRAWINGS

Many aspects of the present method for making the branched CNTs can be better understood with reference to the following drawings. The components in the drawings are not necessarily to scale, the emphasis instead being placed upon clearly illustrating the present method.

DETAILED DESCRIPTION OF PREFERRED EMBODIMENTS

Reference will now be made, in detail, to the drawings to the synthesis of the branched CNTs, according to the present method.

Figure 1:
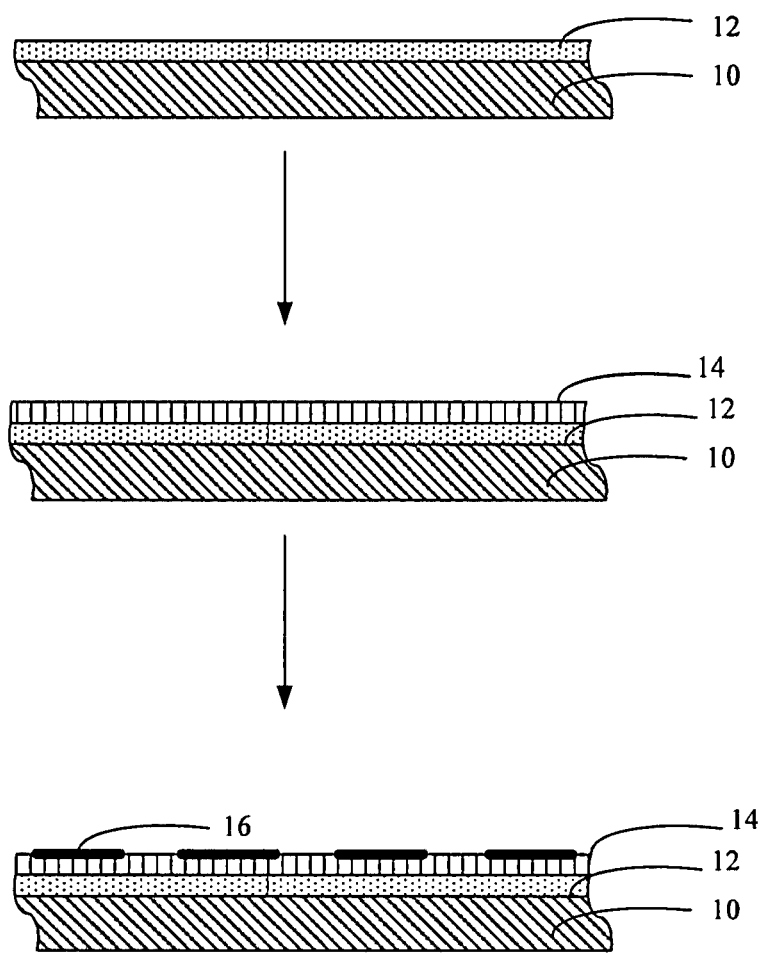
FIG. 1 is a schematic, flow chart, showing successive stages in the present method for making the branched CNTs.

Referring to FIG. 1, a present method for making the branched CNTs is provided. The method includes the steps of:

(1) providing a substrate 10 and forming a buffer layer 12 directly on (i.e., in contact with) the upper surface of the substrate 10;

(2) depositing a catalyst layer 14 on the surface of the buffer layer 12 and, particularly, in contact therewith;

(3) putting the substrate 10 with the buffer layer 12 and the catalyst layer 14 formed thereon into a reactive device; and (4) heating the substrate 10 up to a predetermined temperature (i.e., a reaction temperature) in a flow of protective gas, and, after a period of time, introducing a carbon-containing gas, thereby achieving the branched CNTs 16 on the substrate 10.

In step (1), the substrate 10 can, beneficially, be made of glass, silicon, metal etc. The buffer layer 12 can, usefully, be made of alumina and/or silicon dioxide. The buffer layer 12 may, opportunely, be formed by an electron beam evaporation method, a sputtering method, or a thermal evaporation method. A thickness of the buffer layer 12 is more than 1 nanometer (nm). In the present embodiment, the substrate 10 is made of silicon. The buffer layer 12 is an aluminum oxide layer with a thickness of 10 nm and is formed by the electron beam evaporation method.

In step (2), the catalyst layer 14 may, opportunely, be formed by an electron beam evaporation method, a sputtering method, or a thermal evaporation method. The catalyst layer 14 is advantageously made of a noble metal or an alloy of such metals, e.g., gold, silver, copper, and/or platinum or, alternatively, is made of another known catalyst material, such as nickel. A thickness of the catalyst layer 14 is in an approximate range from 0.5 nm to 1.5 nm. At the synthesis temperature of the branched CNTs, the material of the buffer layer 12 and the material of catalyst layer 14 do not infiltrate and/or wet each other. In the present embodiment, the catalyst layer 14 is a gold layer with the thickness of 1 nm and is formed by the electron beam evaporation method.

In step (3), the reactive device is a traditional tube-shaped furnace with a diameter of about 1 inch.

In step (4), the predetermined temperature is selected according to the material of the catalyst layer 14. In the present embodiment, the temperature is about 880° C.-950° C., beneficially, about 900° C.-950° C. The protective gas advantageously includes hydrogen and argon (i.e., a reducing gas and an inert gas), wherein a flux rate of argon is about 0-140 sccm and a flux rate of hydrogen is about 200 sccm, and beneficially, a flux ratio of argon to hydrogen is about 140:200. The period of time for introducing the protective gas is about 10-30 minutes. The carbon-containing gas can, usefully, be acetylene, ethylene, methane, or any suitable chemical compound that contains carbon. The flux rate of the carbon-containing gas is approximately 10-50 sccm, beneficially, 10-25 sccm. The period of time for introducing the carbon-containing gas is about 5-30 minutes, opportunely, 15 minutes. In the present embodiment, acetylene is used as the carbon-containing gas.

Figure 2:
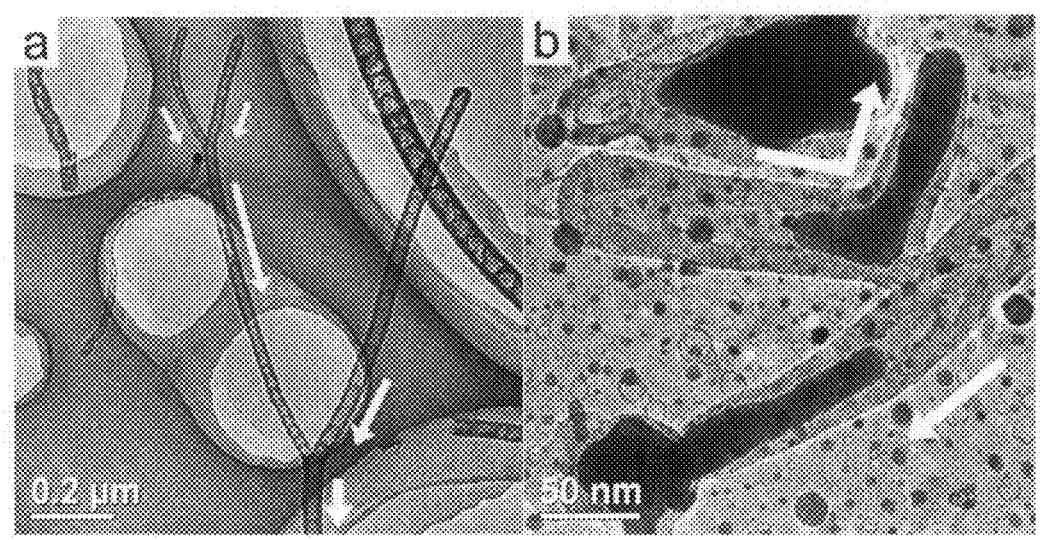
FIG. 2 is a scanning electron microscope (SEM) photo of branched CNTs produced by the present method.
Figure 3:
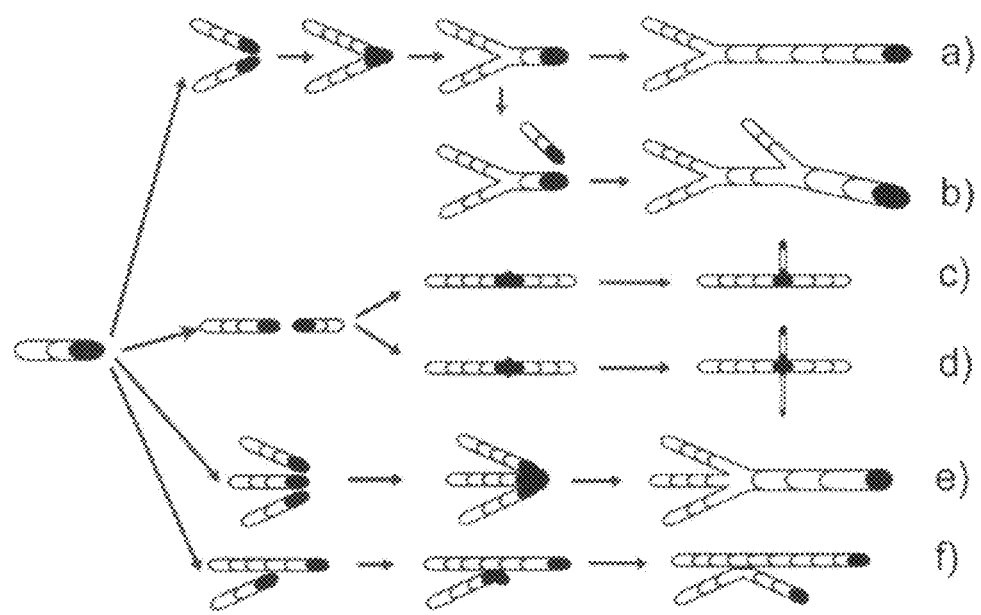
FIG. 3 is a schematic, flow chart, showing successive stages in the present process of forming branched CNTs.

Referring to FIGS. 2 and 3, a process of forming the branched CNTs 16 includes the following steps:

Firstly, the catalyst layer 14 is melted when the substrate 10 is heated up, as in step (4) mentioned above. The catalyst layer 14 is rearranged into a number of catalyst balls (i.e., due to the relative surface tension between the catalyst material and the buffer layer 12), and then the catalyst balls are movable on and along the surface of the buffer layer 12. The catalyst material is driven to form multiple catalyst balls because the material of the buffer layer 12 and the material of catalyst layer 14 do not wet each other.

Secondly, the carbon-containing gas decomposes upon contacting surfaces of the catalyst balls, and then the CNTs are formed thereon. The catalyst balls are movable, and thus the CNTs are formed along the surface of the buffer layer 12, following the movement pattern/trail of the catalyst balls. Each catalyst ball is advantageously located on a distal end (i.e., free tip) of each CNT, but, depending on the catalyst material used, such a catalyst ball could be located at the bottom end of a given CNT, adjacent the buffer layer 12.

Thirdly, when two catalyst balls encounter and incorporate/join into a new catalyst ball, two CNTs following the movement pattern of those two catalyst balls will connect together. Thereafter, another CNT is formed following the movement pattern of the new catalyst ball, and then a Y-shaped CNT (referring to FIGS. 2a and 3a), a Y-shaped CNT (referring to FIG. 3c), or a cross-shaped CNT (referring to FIG. 3d) is achieved. In succession, the catalyst ball on a distal end of the Y-shaped CNT encounters another catalyst ball of the CNT, and then a kind of multi-branched CNT is achieved (referring to FIG. 3b). In the same way, more than two catalyst balls encounter and incorporate into a new catalyst ball, a CNT is formed following the movement pattern of the new catalyst ball, and then another kind of multi-branched CNT is achieved (referring to FIG. 3e). Particularly, when the catalyst ball of a first CNT encounters the outer side of a second CNT, the catalyst ball of the first CNT will change the movement orientation. As a result, the first CNT and the second CNT are separately formed along their own pattern, and then a K-shaped CNT is achieved (referring to FIGS. 2b and 3f). The branched CNTs, made by the present method, have higher yield of 30%-50%, and the branched CNTs with the noble metal located on the distal end thereof can be directly applied to nano-scale integrated circuit. Further, it is to be understood that the location of the catalyst ball is catalyst material dependent. For example, the Au catalyst is located on a distal/free end of the CNT, with the CNT pushing the catalyst. Alternatively, the Ni catalyst is located at the bottom end of the CNT and is in contact with the substrate.

Finally, it is to be understood that the embodiments mentioned above are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a branched carbon nanotube structure, the method comprising steps, as follows:
    providing a substrate and forming a buffer layer on a surface of the substrate, wherein the buffer layer is made of at least one material selected from the group consisting of alumina and silicon dioxide;
    depositing a catalyst layer on a surface of the buffer layer, material of the catalyst layer being non-wetting with material of the buffer layer at a temperature that the branched carbon nanotube structure is formed, wherein the catalyst layer is made of a noble metal;
    putting the substrate with the buffer layer and the catalyst layer formed thereon into a reactive device; and
    forming the branched carbon nanotubes on the surface of the buffer layer and along the surface of the buffer layer by a chemical vapor deposition method;
    wherein the chemical vapor deposition method comprises steps as follows:
    heating the substrate up to a predetermined temperature;
    introducing a protective gas for a first predetermined time until the catalyst layer is melted and forms into a plurality of catalyst balls;
    introducing a carbon-containing gas for a second predetermined time; and
    forming the branched carbon nanotube structure on the surface of the buffer layer and along the surface of the buffer layer, wherein the catalyst balls are movable on and along the surface of the buffer layer and encounter and incorporate with adjacent catalyst balls to form a plurality of new catalyst balls.

2. The method for making the branched carbon nanotubes as claimed in claim 1, wherein a thickness of the buffer layer is approximately more than 1 nanometer.

3. The method for making the branched carbon nanotubes as claimed in claim 1, wherein a thickness of the catalyst layer is in an approximate range from 0.5 nanometers to 1.5 nanometers.

4. The method for making the branched carbon nanotubes as claimed in claim 1, wherein the predetermined temperature is based upon the material used for the catalyst layer.

5. The method for making the branched carbon nanotubes as claimed in claim 4, wherein the catalyst layer is made of gold.

6. The method for making the branched carbon nanotubes as claimed in claim 4, wherein the predetermined temperature is about 880° C. to about 950° C.

7. The method for making the branched carbon nanotubes as claimed in claim 1, wherein the protective gas comprises argon and hydrogen.

8. The method for making the branched carbon nanotubes as claimed in claim 7, wherein a flux rate of argon is about 0 sccm to about 140 sccm, and a flux rate of hydrogen is about 200 sccm.

9. The method for making the branched carbon nanotubes as claimed in claim 8, wherein a flux ratio of argon to hydrogen is about 140:200.

10. The method for making the branched carbon nanotubes as claimed in claim 1, wherein the carbon-containing gas is made of at least one material selected from the group consisting of acetylene, ethylene, and methane.

11. The method for making the branched carbon nanotubes as claimed in claim 1, wherein a flux rate of the carbon-containing gas is about 10 sccm to about 50 sccm.

12. The method for making the branched carbon nanotubes as claimed in claim 1, wherein the first predetermined time is about 10 minutes to about 30 minutes.

13. The method for making the branched carbon nanotubes as claimed in claim 1, wherein the second predetermined time is about 5 minutes to about 30 minutes.

14. The method for making the branched carbon nanotubes as claimed in claim 1, wherein the metal is a pure material.

15. A method for making a branched carbon nanotube structure, the method comprising:
- providing a substrate;
- forming a buffer layer on a surface of the substrate;
- depositing a catalyst layer on a surface of the buffer layer, a material of the catalyst layer being non-wetting with a material of the buffer layer at a temperature that the branched carbon nanotube structure is grown, wherein the catalyst layer is made of pure noble metal;
- putting the substrate with the buffer layer and the catalyst layer formed thereon into a reactive device; and
- growing the branched carbon nanotubes on the surface of the buffer layer and along the surface of the buffer layer by a chemical vapor deposition method.

16. The method for making the branched carbon nanotube structure as claimed in claim 15, wherein the catalyst layer is made of gold, silver, or platinum.

17. The method for making the branched carbon nanotube structure as claimed in claim 15, wherein the catalyst layer is made of an alloy of noble metals selected from the group consisting of gold, silver, and platinum.

18. A method for making a branched carbon nanotube structure, the method comprising:
- providing a substrate and forming a buffer layer on a surface of the substrate;
- depositing a catalyst layer on a surface of the buffer layer, a material of the catalyst layer being non-wetting with a material of the buffer layer at a temperature that the branched carbon nanotube structure is grown, wherein the catalyst layer is made of metal being selected from the group consisting of gold, silver, copper, platinum, and nickel;
- putting the substrate with the buffer layer and the catalyst layer formed thereon into a reactive device; and
- growing the branched carbon nanotube structure on the surface of the buffer layer and along the surface of the buffer layer by a chemical vapor deposition method.

* * * * *